March 5, 1929. J. W. D. CHESNEY 1,704,173
PROCESS FOR TREATING FOODS
Filed April 30, 1928
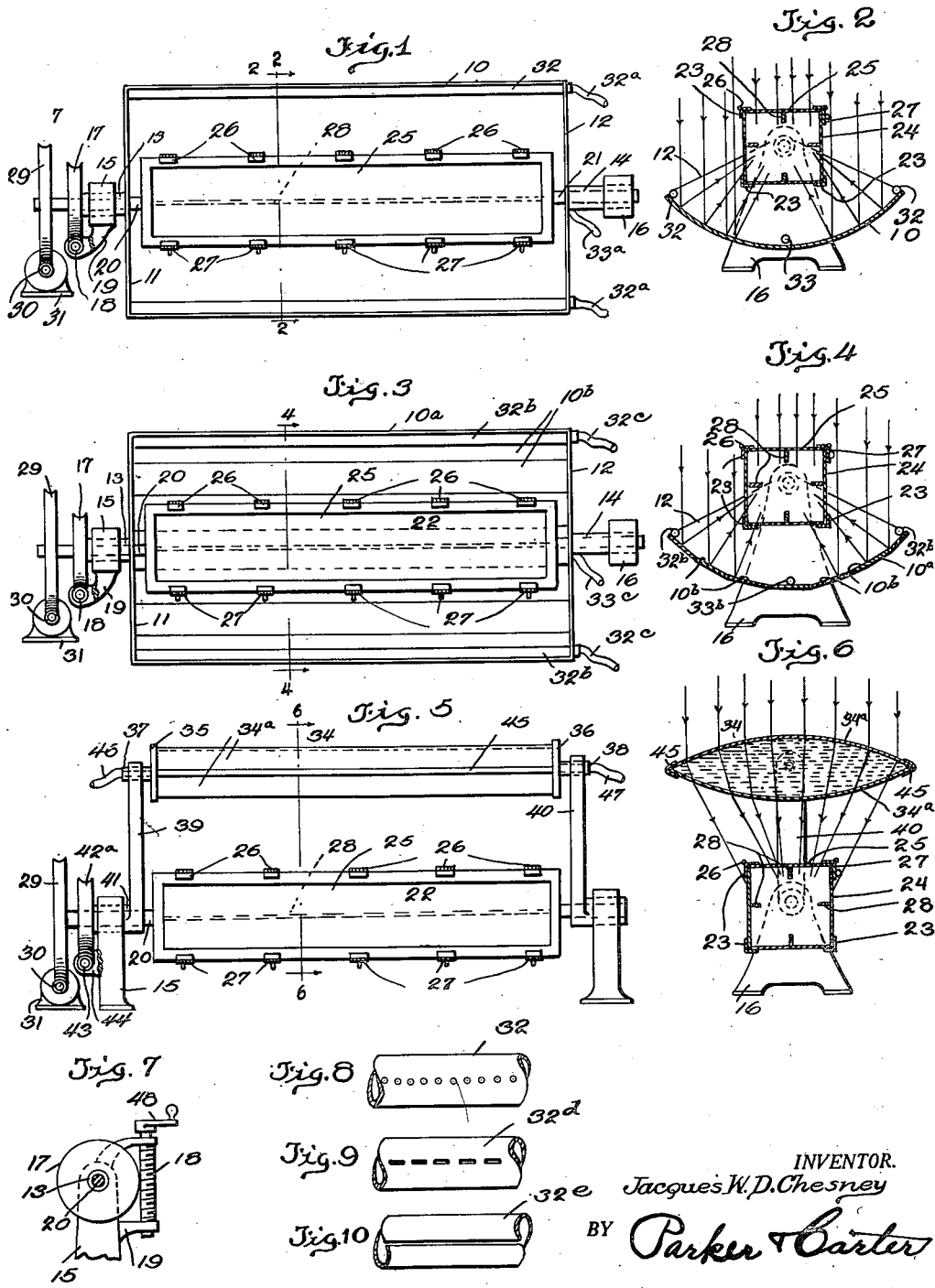
INVENTOR.
Jacques W. D. Chesney
BY Parker & Carter
ATTORNEY.

Patented Mar. 5, 1929.

1,704,173

UNITED STATES PATENT OFFICE.

JACQUES W. D. CHESNEY, OF CHICAGO, ILLINOIS, ASSIGNOR TO SOLAR RESEARCH CORPORATION, OF CHICAGO, ILLINOIS, A CORPORATION OF ILLINOIS.

PROCESS FOR TREATING FOODS.

Application filed April 30, 1928. Serial No. 273,921.

My invention relates to an improved process for treating foods both liquids and solids with ultra-violet radiation from the sun that is, a method of making the ultra violet rays of the sun available practically for the production of the anti-rachitic principle in substances susceptible of such activation. I am aware that it has been proposed to produce ultra-violet rays artificially and to treat foods with them to secure, at least in part, the advantageous results accompanying the use of the process and apparatus of the present application. When my process is used I find that ultra-violet rays derived from sunlight or skyshine, possess a degree of efficacy, as a means for activating food stuffs both liquid and solid, that cannot be equalled when it is attempted to produce the ultra-violet rays artificially, or in other words the ultra-violet rays in the condition they are when first received from the prime source of all energy, are more effective in properly treating foods than are ultra-violet rays produced artificially and particularly when produced by so called ultra-violet lamps.

Experiment and analysis show that rays of sunlight and skyshine having wave lengths from 2900 Angstrom units to approximately 3700 Angstrom units are the rays that are effective in activating the sterols that would otherwise be contained in the foods and that it is by the action of rays within this range that vitamin D is photosynthesized. When vitamin D is thus produced it is in condition to effectively perform its function of fixing calcium, iron, phosphorus and iodine, that is, to cause these elements in foods which may be eaten, to be assimilated and perform their proper functions in the body. The absence of vitamin D in such effective form, results in a failure to assimilate these several elements, and absence of these elements in the human system produces ills covering nearly the entire range of human disorders. The importance of having this vitamin D in active condition in the human body is thus apparent. The ultra-violet rays of solar radiation have the desirable property of killing disease bacteria or bacilli, for example Bacillus tuberculosis and Bacillus anthracis.

Where rays shorter than the range of wave lengths referred to as constituting the solar ultra-violet rays, are employed to activate food, they cause the oxygen of the air to be photo-synthesized into ozone and they produce various oxides of nitrogen, which not only destroy vitamin C and vitamin A, but also impart a most disagreeable odor and taste to delicate food products. These rays of shorter wave length also coagulate the albumin in various food products and make it more difficult of digestion than when in its uncoagulated condition; they also kill vitamin D, if applied to foods for considerable intervals. When these vitamins are killed in this manner, there is no known way by which they may be revived or activated.

Rays of shorter wave length than the ultra-violet rays of solar radiation, are generally produced when ultra-violet rays are generated artificially, for example by mercury vapor lamps, and when so produced, it is practically impossible to eliminate them from the ultra-violet rays of beneficial wave length so produced, when the latter rays are used to treat foods.

When I refer to the treatment of foods by the ultra-violet rays of solar radiation, I mean that the treatment shall be by rays having the effect of activating the elements or organisms in the foods, that are health giving in their effect; also, that the treatment shall be free from the application of rays that can kill the desirable or beneficial organisms or elements of the foods.

My improved method of treating foods, both liquid and solid, consists of collecting rays of sunlight or skyshine, and directing the rays in a concentrated beam upon the food being treated, and preferably including during the operation, the absorption of rays of relatively long wave length, so that they will not reach and operate upon the food being treated. I find that the rays of longer wave length referred to which may be generally classified as heat rays, or heat producing rays, if permitted to act upon the food, produce an undesirable effect in that the heat developed, undesirably energizes the ferments in the food. By my process therefore, I preferably eliminate these heat rays or heat producing rays from the collected rays before the concentrated beam of rays acts upon the food being treated.

The apparatus employed in carrying out my process consists essentially of a ray concentrator of one kind or another, for example a lens transparent to ultra-violet rays, or a reflector capable of reflecting ultra-violet rays, and a container for holding the substance being treated which container is located in the path of the beam of rays condensed by the ray concentrator. My apparatus further provides for absorbing the relatively long rays or heat producing rays, either by the construction of the ray concentrator itself, or by causing the rays to pass through a medium capable of absorbing the heat producing rays, on their course to the food being treated.

My invention will best be understood by reference to the accompanying drawings illustrating diagrammatically apparatus that may be employed in carrying out my improved process, in which Fig. 1 shows in diagrammatic plan view one form of my apparatus in which my ray concentrator is in the form of a reflector, Fig. 2 is a sectional view of the parts shown in Fig. 1 taken along the line 2—2, Fig. 3 shows in a view similar to Fig. 1 a modified form of reflector construction, Fig. 4 is a sectional view of the part shown in Fig. 3 taken along the line 4—4, Fig. 5 shows in diagrammatic side elevation apparatus for carrying out my improved process in which the ray concentrator comprises a lens, Fig. 6 is a sectional view of the parts shown in Fig. 5 taken along the line 6—6, Fig. 7 is a sectional view of the parts shown in Fig. 1 taken along the line 7—7, Fig. 8 is a bottom view of a portion of a water pipe that may be employed with the constructions shown in Figs. 1–4 inclusive to produce a water film to absorb heat producing rays, and Figs. 9 and 10 show in views similar to Fig. 8 modified forms of outlet apertures in water pipes that may be similarly used.

Similar numerals refer to similar parts throughout the several views.

As shown in Fig. 1 my device consists of a reflector 10, preferably prismatic in form, open at its upper side and provided with end walls 11 and 12. The walls 11 and 12 have extending from them, sleeves 13 and 14 supported in bearings 15 and 16 to support the reflector in desired position. The sleeve 13 has rigidly secured thereto a worm wheel 17 meshing with a worm 18 carried by arms 19 extending from the bearing 15, so that turning the worm 18 may rotate the reflector 10 in its bearings 15 and 16. The sleeves 13 and 14 contain and support shafts 20 and 21 rigidly secured at their inner ends to a receptacle 22 consisting of a framework of corner bars 23 extending longitudinally of the receptacle and sheets 24 fixed to the bars 23, which sheets constitute the side walls of the receptacle and are transparent to ultra-violet rays. One side of the receptacle may consist of a door 25 hinged to the framework of the receptacle as indicated at 26 and provided with suitable catches 27 to hold it in tightly closed condition after the food to be treated has been placed in the receptacle. The door 25 may be constructed in the same manner as the receptacle, that is to say, it may consist of a framework of supporting bars and a sheet of material transparent to ultra-violet rays. Inside of the receptacle 22, I preferably mount baffle bars 28 so that the rotation of the receptacle will agitate the food therein and expose all of it to the rays that treat it.

The shaft 20 carries at its outer end a worm wheel 29 meshing with a worm 30 carried by the shaft of a motor 31, the ratio of the gearing being such that operation of the motor 31 will slowly rotate the receptacle 22.

The reflector 10 is either made of or coated with material which is a reflector of ultra-violet rays, for example Monel metal which is an alloy of copper and nickel or magnalium which is an alloy of magnesium and aluminum. The side walls 24 and the panel portion of the door or cover 25 may consist of any material transparent to ultra-violet rays, for example ultra-violet glass, fused quartz, pyroxalin fabric, rayon or artificial silk or flexible glass composed of urea, formaldehyde and other hydrocarbons.

The reflector 10 is preferably provided along its upper edges with pipes 32 which are perforated or slotted along their lower surfaces to deliver a thin sheet of water over the reflecting surface of the reflector, an outlet pipe 33 being provided at one end of the reflector preferably connected for convenience with a flexible tube 33$^a$ to carry away the discharge water as desired. The pipes 32 are preferably connected at one end with flexible tubes 32$^a$ to supply water from any suitable source to the pipes, the other end of the pipes being closed so that the water will all pass through the perforations or slits referred to. The perforated construction of pipe 32 is indicated in Fig. 8 while in Fig. 9 a portion of a similar pipe 32$^d$ is indicated in which the lower surface is provided with a plurality of slits to constitute the outlet openings of the pipe and in Fig. 10 a further modified form of pipe is indicated at 32$^e$ in which a single slit extends throughout the length of the pipe to constitute an outlet opening.

The curvature of the reflector 10 and its relation to the container 22 are preferably such that all of the rays of sunlight or skyshine received by the reflector 10 are directed on one or another of the walls of the receptacle 22 and thus upon the food in the receptacle since the side walls of the receptacle are transparent to ultra-violet rays. The degree of concentration may be regulated as desired by the size of the reflector relatively to the receptacle. The food to be treated, whether liquid or solid, is placed in the receptacle and where liquid food is to be treated, the cover 25 is made a tight fit on the receptacle to hold the liquid food in it. The reflector 10 is then tilted in its bearings by means of the worm 18 until its open side is presented to the direction from which the rays of sunlight or skyshine are to be received by the reflector. The motor 31 is then started and the receptacle is rotated slowly until the food has been treated for the desired length of time, which in connection with some foods may be longer than in connection with other foods to properly treat them.

The construction shown in Figs. 3 and 4 is the same as that shown in Figs. 1 and 2, with the exception that the reflector 10 is replaced by a reflector 10$^a$ consisting of a plurality of plane reflector elements 10$^b$ arranged at different angles around the food container 22, so that each of the reflector elements 10$^b$ reflects the rays of sunlight or skyshine upon the surfaces of the container 22 as indicated. In this case the reflector 10$^a$ is provided with water pipes 32$^b$, 32$^b$ supplied with water by connected flexible tubes 32$^c$, 32$^c$ and the used water is drained from the reflector construction through a pipe 33$^b$ and flexible tube 33$^c$, in substantially the manner above described for the construction shown in Figs. 1 and 2. The operation of the device is substantially the same as described above for the construction shown in Figs. 1 and 2.

In the construction shown in Figs. 5 and 6 the reflector 10 shown in Figs. 1 and 2 is replaced by a ray concentrator in the form of of a lens 34, which may conveniently consist of upper and lower sheets of material 34$^a$, 34$^a$ transparent to ultra-violet rays and insoluble in the liquid contained in the lens between said sheets of material. The sheets of material 34$^a$, 34$^a$ may be conveniently mounted between end plates 35, 36 having central tubular trunnions 37, 38 extending therefrom through supporting arms 39, 40 having at their other ends mounting sleeves 41, 42 extending through bearings 15 and 16. In this case the food receptacle 22, constructed in the same manner above described, receives its support by its shafts 20 and 21 fitting the bores of the sleeves 41 and 42 and being rotatable therein. The arms 39 and 40 are of a length to place the receptacle 22 at substantially the focus of the lens 34. The supporting sleeve 41 has secured to its outer end a worm wheel 42 meshing with a worm 43 supported in arms 44 extending from the bearing 15. As a result of this construction, by rotating the worm 43, the lens may be held at any desired inclination to the receptacle 22 around the axis of the latter, to properly receive the desired rays of sunlight or skyshine. The trunnions 37 and 38 permit the lens 34 to be turned in the arms 39 and 40 to properly focus the concentrated rays on the receptacle 22.

The side edges of the sheets 34$^a$, 34$^a$, of the lens 34 may conveniently be engaged by metal strips 45, 45 and these strips and the end walls 35 and 36 of the lens may make tight joints with the sheets of material 34$^a$, 34$^a$ by means of suitable cement or otherwise to form an enclosed compartment for containing liquid constituting the body portion of the lens 34. The liquid employed, for example water, is preferably of such a kind as to be transparent to ultra-violet rays and at the same time absorb the heat producing rays from the beam of light passing through the lens. Flexible tubes 46, 47 may conveniently be connected with the outer ends of the trunnions 37 and 38 to establish a liquid circulation in the lens if desired. The construction of the receptacle 22 and the mechanism employed to rotate it may be the same as above described in connection with Figs. 1 and 2.

In Fig. 7 I show in detail, a means which may be conveniently employed to incline the reflector 10 at any angle desired, consisting of a handle 48 secured to one end of the shaft of the worm 18, so that rotating the handle turns the worm and effects adjustment of the reflector 10 in the manner described. The same construction may be used for rotating the reflector 10$^a$ and for adjusting the lens 34.

From the above it will appear that my invention affords an effective means for utilizing solar radiation in treating food products, with the advantages that the extent of this radiation is practically limitless, that it may be had without cost, that there need be no danger of jecorization of the food products or food stuffs, that fragile and costly equipment may readily be avoided, and that any desired degree of food activation may be secured by correspondingly proportioning the ray concentrator and food receptacle. It will further be observed that all danger incident to the action upon the food stuffs of rays shorter than solar ultra-violet rays is avoided because the use of sunlight or skyshine as the source of the activating rays positively precludes the possibility of such shorter rays being present, which is not the case where artificial sources of ultra-violet rays are relied upon. It will thus be seen that the rays employed may be positively limited, by the absorption of the heat producing rays in the manner above described or its equivalent, to rays which have only a beneficial action on the food stuffs and without producing any deleterious effects which might render them unsuitable or undesirable for consumption by human beings. It will therefore be seen that I have here a method of making the ultra violet rays of the sun available practically for the production of the anti-rachitic principle in substances susceptible of such activation, wherein I separate solar ultra violet rays of wave lengths within the range of substantially 2900 to 3700 Angstrom units from the remaining rays and intensify them by concentration, and then subject the material to be activated to these intensified rays so as to bring about the production of the anti-rachitic principle therein.

I find that my improved process of treatment and the means employed for carrying it into effect, described above, may be effectively employed in treating as described, food stuffs of any kind, whether the entire food stuff be so treated in any case, or a constituent part of the food stuff be so treated. the only requisite being that the substance so treated shall be capable of vitamin D activation by photo-synthesis and that it shall be or be capable of becoming a constituent part of a food stuff of some kind. In the specification and claim I therefore employ the term "food stuffs" in a sufficiently broad sense to include the food stuffs themselves and any such constituent parts thereof.

While I have shown my invention in the particular embodiment above described, it will be understood that I do not limit myself to this exact construction as I may employ equivalents known to the art at the time of the filing of this application without departing from the scope of the appended claim.

What I claim is:

The method of making the ultra-violet rays of the sun available practically for the production of the antirachitic principle in substances susceptible of such activation, which consists in separating solar ultra-violet rays of wave lengths within the range of substantially 2900 to 3700 Angstrom units from the remaining rays, and intensifying by concentration the separated ultra-violet rays of the wave lengths specified, and subjecting the material to be activated to such separated, intensified rays, to bring about the production of the antirachitic principle therein.

In witness whereof, I hereunto subscribe my name this 23rd day of April, A. D. 1928.

JACQUES W. D. CHESNEY.